July 24, 1951 — E. P. PALMATIER — 2,561,633
SYSTEM FOR REFRIGERATING AIRCRAFT STORAGE COMPARTMENTS
Filed May 14, 1947
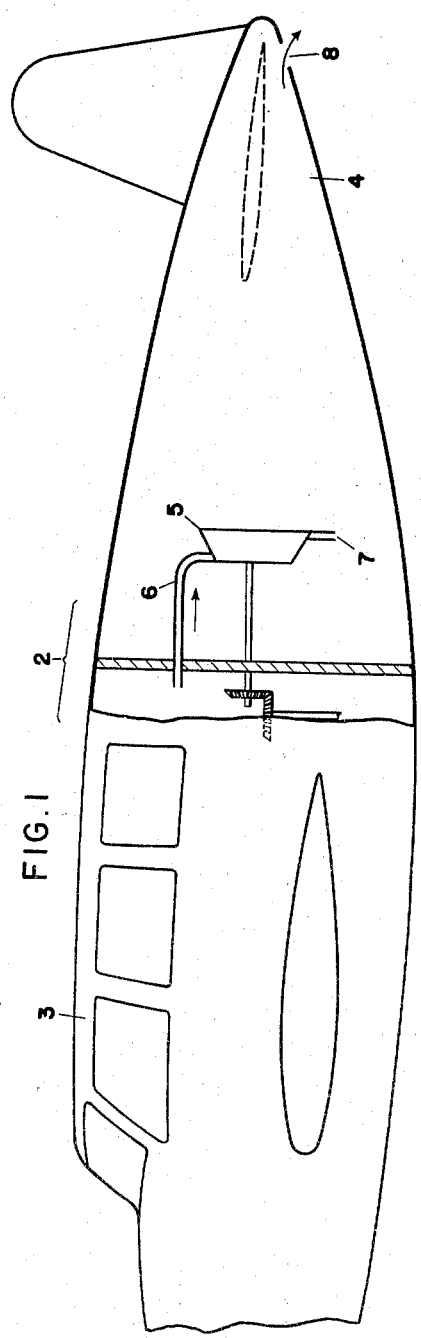
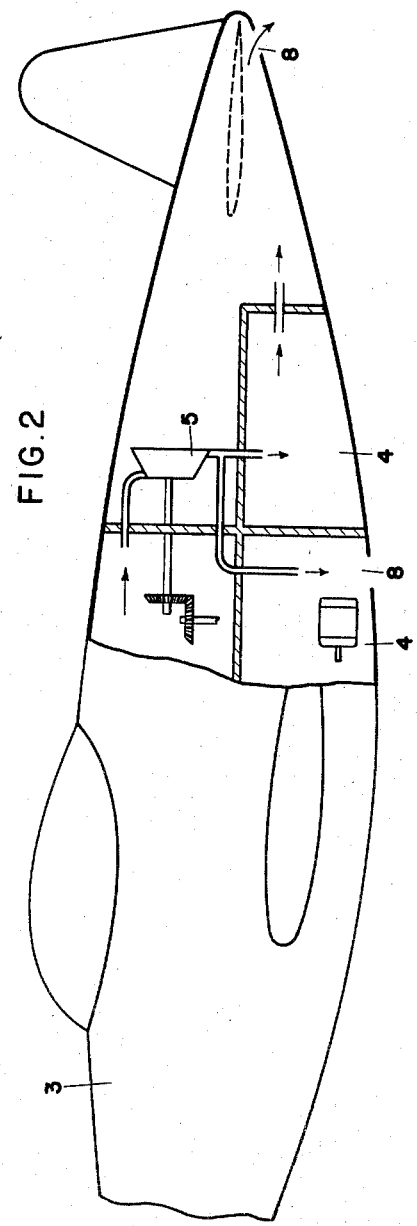
INVENTOR.
Everett P. Palmatier
BY Patented July 24, 1951

2,561,633

UNITED STATES PATENT OFFICE 2,561,633

SYSTEM FOR REFRIGERATING AIRCRAFT STORAGE COMPARTMENTS

Everett P. Palmatier, Solvay, N. Y., assignor to Carrier Corporation, Syracuse, N. Y., a corporation of Delaware Application May 14, 1947, Serial No. 748,105

4 Claims. (Cl. 62—136)

This invention relates to the refrigeration of aircraft and, more particularly to a system for refrigerating aircraft storage compartments, compartments for auxiliary equipment or the like at high altitudes by utilizing the air pressure maintained in the passenger compartment or cockpit of the aircraft.

In combined passenger and cargo airplanes, it is customary to cool air in the passenger compartment while supplying at the same time a certain quantity of ventilation air. Air may be exhausted from the passenger compartment exteriorly of the plane by means of a suitable relief valve. At high altitudes it is customary to maintain a pressure in the passenger compartment equivalent to that at a lower altitude and sometimes substantially equivalent to the atmospheric pressure at sea level in order to maintain comfortable conditions. However, in those cases where refrigeration for long hauls need be provided in the cargo compartment it has been necessary to increase the size of the refrigerating equipment required which reduces the possible pay-load of the plane and thus greatly increase the costs of operation as well as the initial equipment cost.

The chief object of the present invention is to provide a refrigerating system for aircraft in which the cargo space may be adequately refrigerated at high altitudes without substantial increase in operating costs or a material reduction in the available carrying space of the plane.

An object of the present invention is to provide a refrigerating system for aircraft in which one or more compartments of the aircraft at high altitudes are maintained under a pressure greater than the pressure of the surrounding atmosphere in order to provide conditions approximating those encountered at lower altitudes while at least one other compartment of the craft possesses a pressure substantially corresponding to that of the surrounding atmosphere, and an expansion turbine is provided to permit air under pressure from the first compartment to pass therethrough into the second compartment to maintain the second compartment at a lower temperature than the first compartment.

A further object is to provide a refrigerating system for aircraft adapted for high speeds at which heat is generated, which requires less air to be handled and less power to operate the system than required for systems heretofore utilized for cooling aircraft. Other objects will be readily perceived by reference to the following description.

This invention relates to a refrigeration system for aircraft comprising in combination a compartment of the aircraft maintained at high altitudes under a pressure greater than the pressure of the surrounding atmosphere, a second compartment at pressure below the pressure of the first compartment, means interposed between the compartments for receiving air from the first compartment and for expanding the air into the second compartment thereby maintaining the second compartment at a temperature below the temperature of the first compartment. Any suitable means may be provided for using or absorbing the power generated by said means of expanding the air.

The attached drawing illustrates a preferred embodiment of my invention, in which Figure 1 is a diagrammatic view illustrating an aircraft provided with the refrigerating system of the present invention; and Figure 2 is a diagrammatic view illustrating a modification of the present invention.

Referring to the drawing, there is shown in Figure 1 a combined passenger and cargo airplane 2. Airplane 2 includes a passenger compartment 3 and a storage space or compartment 4 for cargo. Any suitable equipment (not shown) may be provided to cool compartment 3 and at high altitudes to maintain therein a pressure greater than the pressure of the surrounding atmosphere. A suitable expansion device such as an expansion turbine 5 is connected to compartment 3 by a line 6; turbine 5 is provided with a suitable discharge opening 7 opening into or connected with compartment 4. Compartment 4 may be provided with a suitable exhaust opening 8 to permit air therein to flow exteriorly of the plane. Turbine 5 may be disposed in any desired position in plane 2 but it is essential for the purposes of the present invention that it receive air under pressure from compartment 3 and supply the air after expansion to compartment 4. Air passing through turbine 5 is expanded thus reducing its temperature and is supplied to compartment 4 to maintain the same at a lower temperature than compartment 3. The power output of the turbine may be utilized or dissipated as desired.

It will be appreciated no substantial temperature difference can be maintained between compartment 3 and compartment 4 until there is an appreciable pressure difference between such spaces. Assume, however, that the plane is flying at an elevation of say 10,000 feet, passenger compartment 3 being maintained at a pressure substantially corresponding to sea level;

under such conditions, cargo compartment 4 may be maintained at a temperature 30°–40° F. below the temperature of passenger compartment 3. For operation at higher flight altitudes, the ratio of pressures between the compartments may be increased with resulting greater temperature differentials.

The cargo to be refrigerated during the flight may be precooled to maintain satisfactory conditions in the cargo space during the time interval required for the plane to climb to altitudes at which the refrigeration system commences operation.

It will be appreciated a considerable problem exists in cooling various types of auxiliary equipment such as radios, electric motors, etc. employed in high speed aircraft. At speeds approaching the speed of sound, the entire plane tends to grow hot. Temperature rises of as much as 300° and 400° F. are foreseen for supersonic planes. Under these conditions, the pilot or passenger compartment of the plane must be cooled and provided with ventilating air as well as at high altitudes having a pressure maintained therein greater than the pressure of the surrounding atmosphere. The high temperatures encountered may damage or reduce the efficiency of auxiliary equipment. As shown in Figure 2, air from the pressurized compartment 3 may be expanded through turbine 5 and directed to the various compartments 4 to be cooled. Additional refrigerating effect may be obtained and, if an air cycle refrigeration system is used for the passenger compartment, less air need be handled and less power required to operate the system.

The present invention provides an efficient and economical system for refrigerating storage compartments of aircraft at high altitudes. The system so provided permits the maintenance of the passenger and storage compartments at different temperatures or may be utilized to reduce the total amount of refrigeration effect required to be supplied in the plane.

While I have described a preferred embodiment of my invention it will be understood my invention is not limited thereto since it may be otherwise embodied within the scope of the following claims.

I claim:

1. In a refrigeration system for aircraft, the combination of a passenger space maintained at a pressure greater than the pressure of the surrounding atmosphere, a second storage space at a pressure less than the pressure of the first space, and means for receiving air from the first space and for expanding the air for supply to the second space to maintain the second space at a lower temperature than the first space.

2. In a refrigeration system for aircraft, the combination of a pressurized passenger space maintained at a pressure greater than the pressure of the surrounding atmosphere, a plurality of spaces for the reception of auxiliary equipment, and means for maintaining the auxiliary equipment spaces at a temperature less than the temperature of the pressurized space, said means including an expansion turbine adapted to receive air from the first space and to expand such air for supply to the auxiliary equipment spaces thereby cooling the same to a temperature below the temperature of the pressurized space.

3. In an aircraft having a passenger compartment adapted to be maintained at a desired pressure greater than the pressure of the surrounding atmosphere and a second storage compartment at a pressure less than the pressure of the first compartment, means adapted to receive air from the first compartment and to expand such air for supply to the second compartment to maintain the second compartment at a temperature below the temperature of the first compartment.

4. In an aircraft having a passenger compartment adapted to be maintained at a desired pressure greater than the pressure of the surrounding atmosphere and a second storage compartment at a pressure less than the pressure of the first compartment, an expansion air turbine adapted to receive air from the first compartment and to expand such air for supply to the second compartment to maintain the second compartment at a temperature below the temperature of the first compartment.

EVERETT P. PALMATIER.

REFERENCES CITED

The following references are of record in the file of this patent:

UNITED STATES PATENTS

| Number | Name | Date |
| --- | --- | --- |
| 1,824,037 | Dean | Sept. 22, 1931 |
| 2,119,402 | Puffer | May 31, 1938 |
| 2,391,838 | Kleinhans | Dec. 25, 1945 |
| 2,412,110 | Williams | Dec. 3, 1946 |
| 2,479,991 | Wood | Aug. 23, 1949 |